United States Patent
Shih (10) Patent No.: US 10,085,568 B2
(45) Date of Patent: Oct. 2, 2018

(54) ELECTRIC BED FRAME

(71) Applicant: Chuan-Hang Shih, Lu-Kang Township, Changhua County (TW)

(72) Inventor: Chuan-Hang Shih, Lu-Kang Township, Changhua County (TW)

(*) Notice: Subject to any disclaimer, the term of this patent is extended or adjusted under 35 U.S.C. 154(b) by 323 days.

(21) Appl. No.: 15/203,372

(22) Filed: Jul. 6, 2016

(65) Prior Publication Data

US 2017/0280882 A1 Oct. 5, 2017

(30) Foreign Application Priority Data

Apr. 1, 2016 (TW) .............................. 105204631 U (51) Int. Cl.
*A47C 19/00* (2006.01)
*A47C 20/04* (2006.01)
*A47C 19/02* (2006.01)
*F16B 12/56* (2006.01)

(52) U.S. Cl.
CPC .......... *A47C 20/041* (2013.01); *A47C 19/025* (2013.01); *F16B 12/56* (2013.01)

(58) Field of Classification Search
CPC ................................ A47C 19/00; A61G 7/002
USPC .......................... 5/282.1, 610, 613–618, 620
See application file for complete search history.

(56) References Cited

U.S. PATENT DOCUMENTS

| 4,381,571 A * | 5/1983 | Elliott | A61G 7/015 5/616 |
| 7,845,034 B2 * | 12/2010 | Kim | A61G 7/015 5/608 |
| 2017/0027333 A1 * | 2/2017 | Shih | A47C 19/021 |

* cited by examiner

*Primary Examiner* — Fredrick C Conley
(74) *Attorney, Agent, or Firm* — Muncy, Geissler, Olds & Lowe, P.C.

(57) ABSTRACT

An electric bed frame for connection with a bed frame includes a fixed rack, a movable rack, a hitching bracket and a fastener. The fixed rack has a through hole. The movable rack is movably attached to the fixed rack. The hitching bracket has a striding portion for being disposed on a side rack of the bed frame, and an extended portion extended from the striding portion and having a groove. The fastener is inserted through the through hole of the fixed rack and the groove of the hitching bracket for connecting the hitching bracket with the fixed rack. As a result, the user has no need to throw away the normal bed existing at home and buy a whole new electric bed, and can enjoy the lifting and lowering effect like the electric bed on the existing normal bed.

15 Claims, 7 Drawing Sheets

ELECTRIC BED FRAME

BACKGROUND OF THE INVENTION

1. Field of the Invention

The present invention relates to bed frames and more particularly, to an electric bed frame.

2. Description of the Related Art

A conventional electric bed, which includes an electric bed frame, a foot frame and a mattress, can lift the back or the legs of the user, and the form of the electric bed is adjustable according to the personal demands of the consumer so that the consumer can rest on the electric bed in the most comfortable form for the consumer for physical and emotional relaxation. However, some consumers may be unwilling to buy the electric bed because they think it's wasteful to buy a whole new electric bed and throw away a normal bed which has existed at home for rest and sleep, thereby sacrificing the chance to rest and relax well. Therefore, it is an objective for the dealers in the industry to provide an electric bed frame which can be used in coordination with the traditional bed.

SUMMARY OF THE INVENTION

The present invention has been accomplished in view of the above-noted circumstances. It is an objective of the present invention to provide an electric bed frame which can be used in coordination with the traditional bed for functioning like the electric bed on the traditional bed.

To attain the above objective, the present invention provides an electric bed frame, which is adapted for connection with a bed frame having a head portion, a foot portion and two side racks. Two ends of each of the side racks are connected with the head portion and the foot portion respectively. The electric bed frame includes a fixed rack, a movable rack, a hitching bracket and a fastener. The fixed rack has a through hole. The movable rack is movably attached to the fixed rack. The hitching bracket has a striding portion for being disposed on the side rack of the bed frame, and an extended portion extended from the striding portion and having a groove. The fastener is inserted through the through hole of the fixed rack and the groove of the hitching bracket for connecting the hitching bracket with the fixed rack.

To attain the above objective, the present invention provides another electric bed frame, which is adapted for connection with a bed frame having a head portion, a foot portion and two side racks. Two ends of each of the side racks are connected with the head portion and the foot portion respectively. The electric bed frame includes a fixed rack, a movable rack and a hitching bracket. The movable rack is movably attached to the fixed rack. The hitching bracket has a striding portion for being disposed on the side rack of the bed frame, and an extended portion extended from the striding portion and adapted for the fixed rack to be placed thereon.

As a result, the user only needs to remove the mattress placed on the normal bed, or remove the bedplate for the mattress to be placed thereon as well, and connect the electric bed frame with the bed frame of the normal bed: at last, the mattress can be placed on the electric bed frame. In this way, the user has no need to throw away the normal bed existing at home and buy a whole new electric bed, and can enjoy the lifting, lowering and massage effect like the electric bed on the existing normal bed.

DETAILED DESCRIPTION OF THE INVENTION

Figure 1:
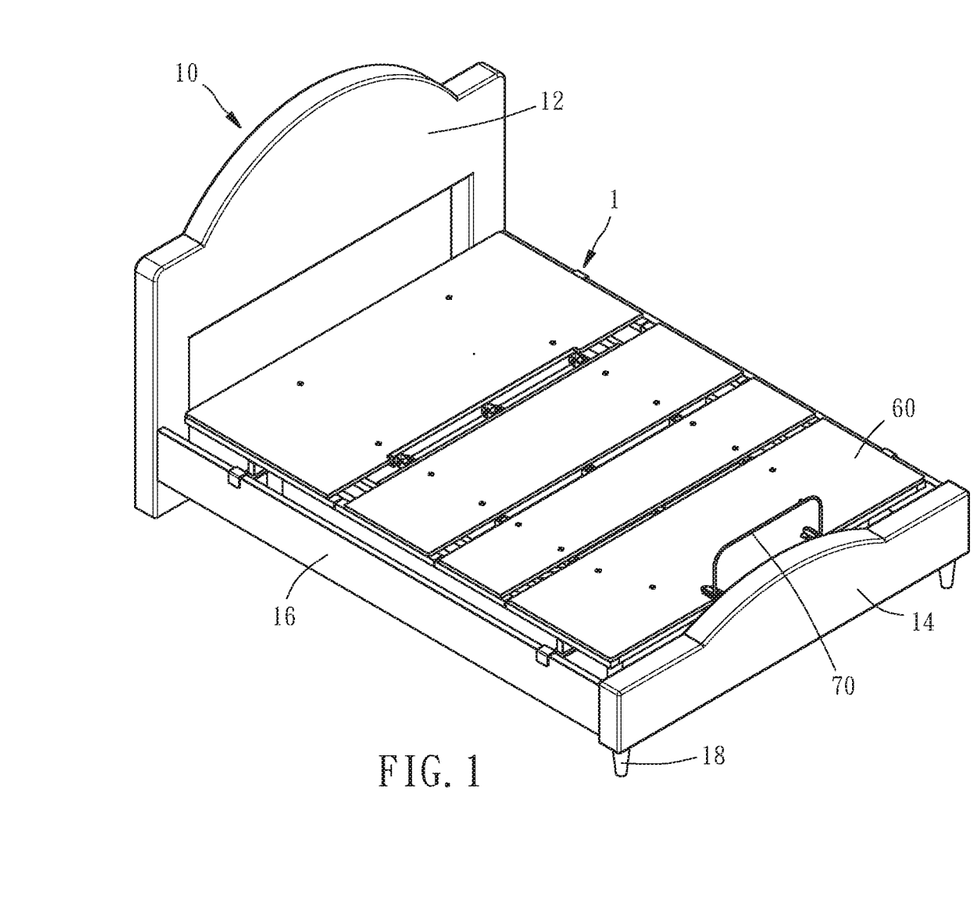
FIG. 1 is a perspective view of a bed frame and an electric bed frame according to a first preferred embodiment of the present invention.
Figure 2:
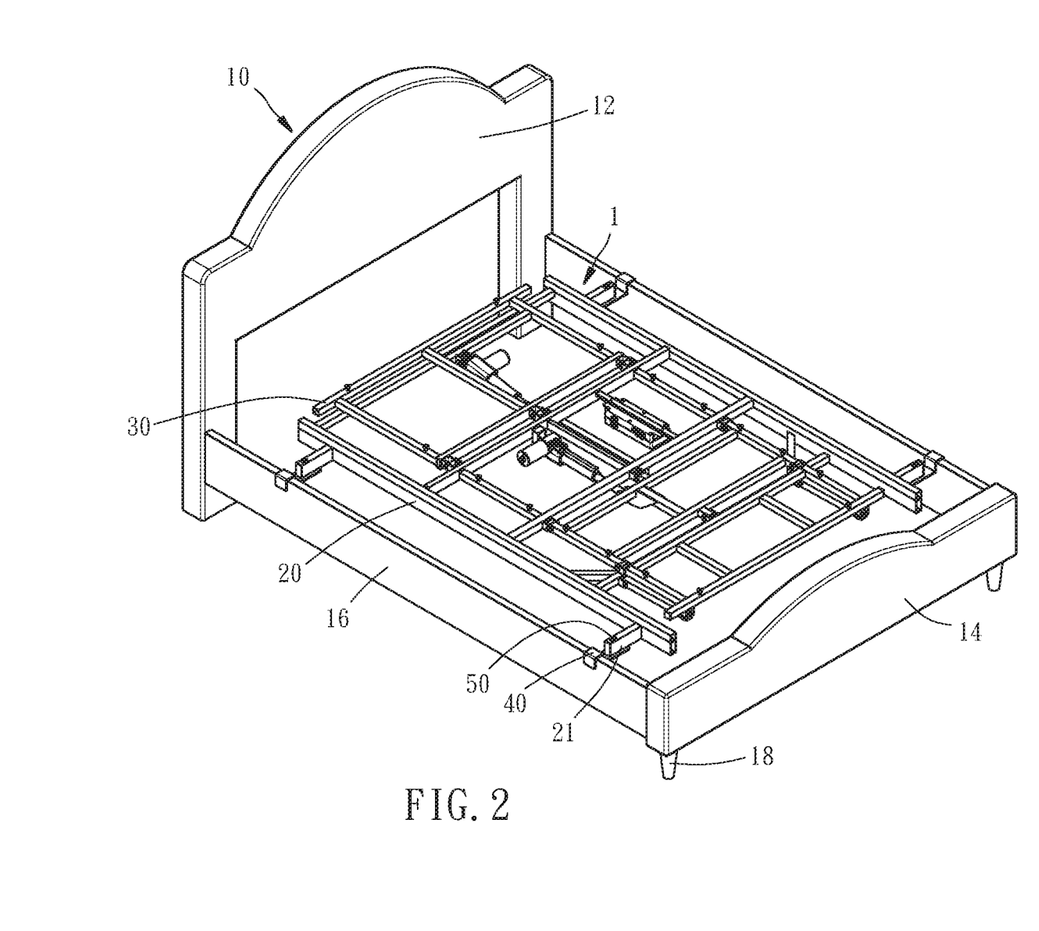
FIG. 2 is a perspective view of the bed frame and parts of the electric bed frame according to the first preferred embodiment of the present invention.

Referring to FIGS. 1-2, an electric bed frame 1 according to a first preferred embodiment of the present invention is adapted for connection with a bed frame 10 having a head portion 12, a foot portion 14, two side racks 16 and two supporting pillars 18 extended downwardly from the foot portion 14. Two ends of each of the side racks 16 are connected with the head portion 12 and the foot portion 14 respectively The electric bed frame 1 includes a fixed rack 20, at least one movable rack 30, four hitching brackets 40, four fasteners 50, four supporting boards 60, and a positioning bracket 70. The electric bed frame 1 is adapted for a mattress (not shown) to be placed thereon.

The fixed rack 20 is provided near four corners thereof with four transverse portions 21. Each of the transverse portions 21 has a through hole 22 (referring to FIG. 5) extended perpendicularly to the floor. Two of the through holes 22 are located adjacent to one of the side racks 16 of the bed frame 10, and the other two through holes 22 are located adjacent to the other side rack 16 of the bed frame 10.

The movable rack 30 is movably attached to the fixed rack 20. In further description, the movable rack 30 can be driven to swing or move relative to the fixed rack 20, the power source of which may be an actuator, an electric cylinder or a hydraulic cylinder. The electric bed frame 1 may include more than one movable rack 30, which may correspond in position to the back, the thigh or the shank of the user. In other words, the movable rack 30 may be able to lift or lower, or even displace, the back, the thigh or the shank of the user.

Figure 3:
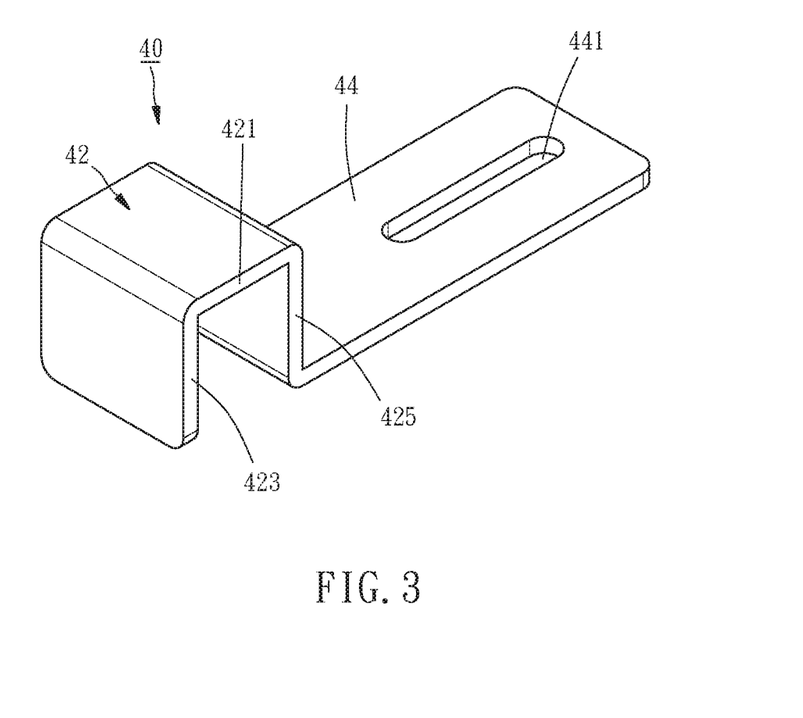
FIG. 3 is a perspective view of a hitching bracket according to the first preferred embodiment of the present invention.

Referring to FIG. 3, the hitching bracket 40 has a striding portion 42 for being disposed on the side rack 16 of the bed frame 10, and an extended portion 44 extended from the striding portion 42. Specifically speaking, the striding portion 42 is reverse-U-shaped and has a top wall 421, an outer wall 423 extended downwardly from an outer side (the farther side from the extended portion 44) of the top wall 421, and an inner wall 425 extended downwardly from an inner side (the closer side to the extended portion 44) of the top wall 421. The extended portion 44 is extended from the bottom of the inner wall 425. The top wall 21 is used to be abutted on a top side of the side rack 16. The outer wall 423 and the inner wall 425 are used to sandwich the side rack 16 therebetween. The outer wall 423 and the inner wall 425 can be completely abutted against or incompletely abutted against the side rack 16. The extended portion 44 has an elongated-shaped groove 441 which is elongated in a direction perpendicular to another direction, in which the side racks 16 of the bed frame 10 are elongated. The aforesaid direction refers to the direction, in which the long edges are extended.

Figure 4:
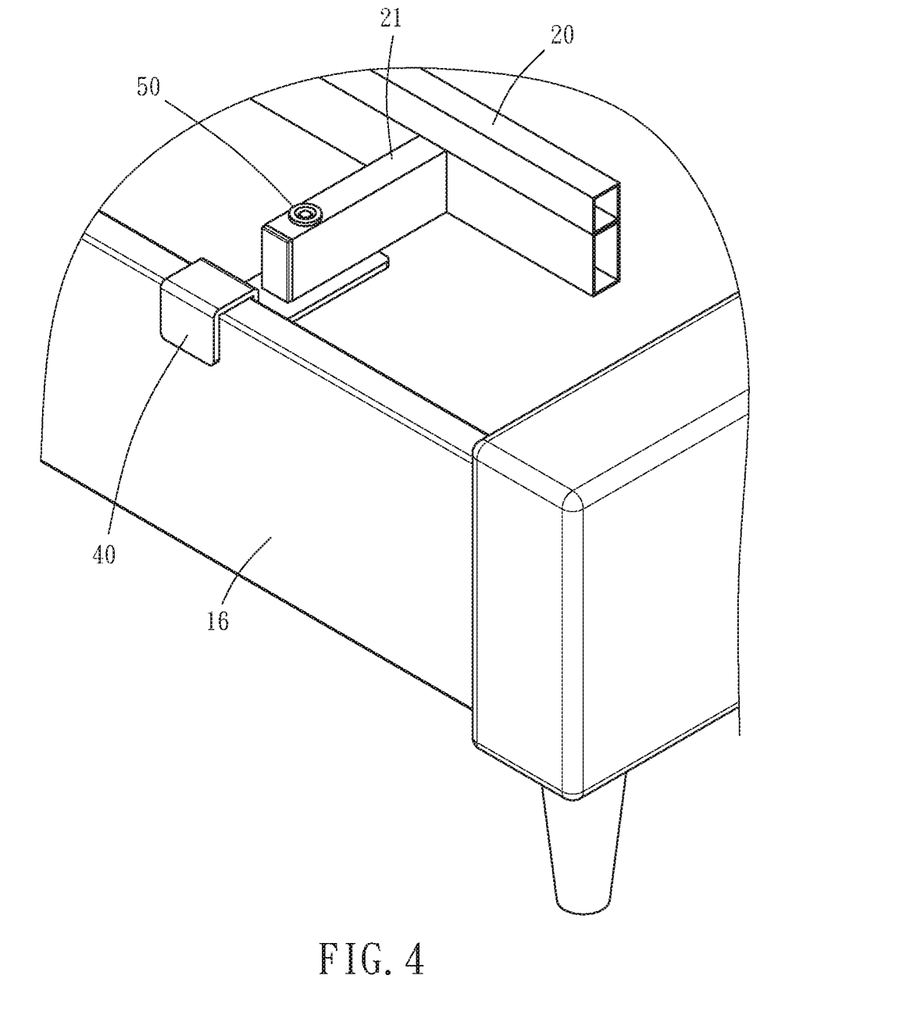
FIG. 4 is a perspective view of a part of the first preferred embodiment of the present invention.
Figure 5:
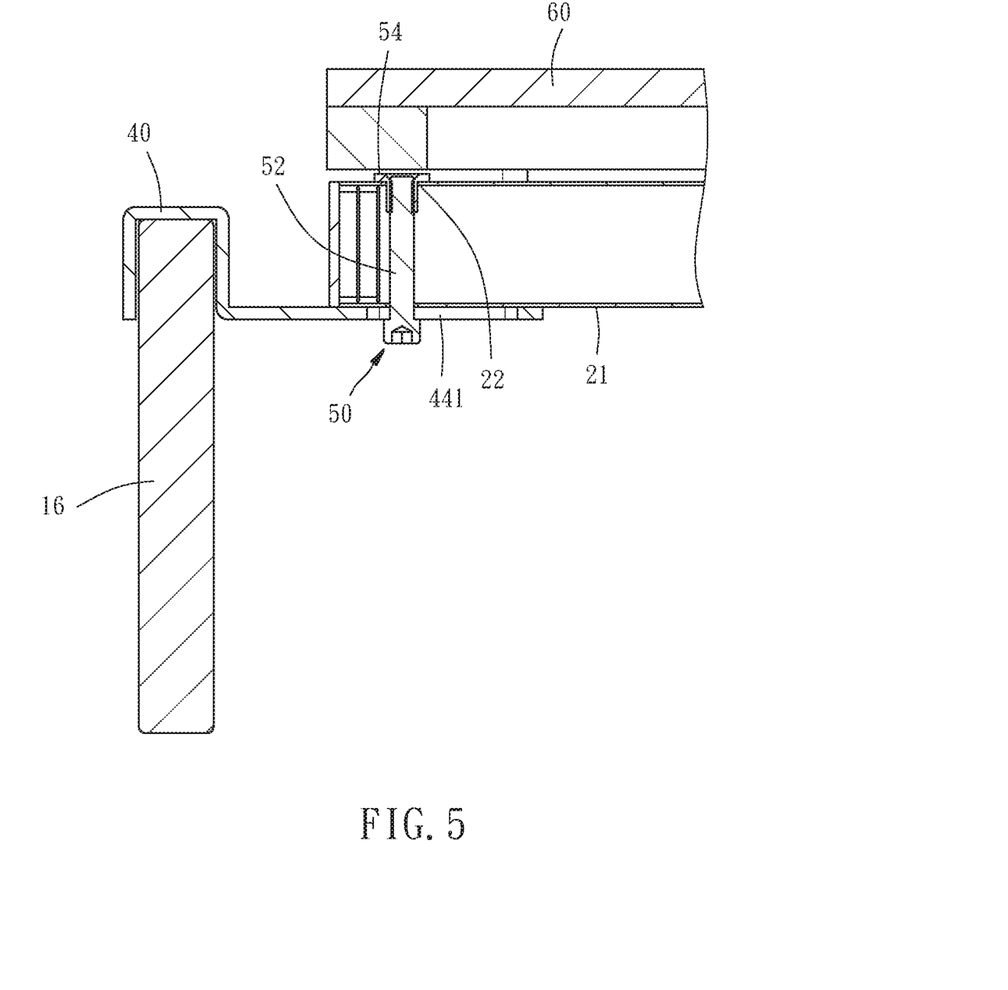
FIG. 5 is a sectional view of a part of the first preferred embodiment of the present invention.

Referring to FIGS. 4-5, the fastener 50 has a screw bolt 52 and a screw nut 54, which are screwed with each other. The fastener 50 is inserted through the through hole 22 of the transverse portion 21 of the fixed rack 20 and the groove 411 of the hitching bracket 40 for connecting the hitching bracket 40 with the fixed rack 20, so that the electric bed frame 1 and the bed frame 10 are combined together. In this embodiment, the screw bolt 52 is upwardly inserted through the groove 441 and the through hole 22 and screwed with the screw nut 54. The elongated grooves 441 enable the hitching brackets 40 to be adjusted in the relative positions thereof to the fixed rack 20, so that the electric bed frame 1 can be matched and combined with various bed frames 10 with various widths. In other embodiments, the fastener 50 may be a pin or other connecting members, as long as it can connect the fixed rack 20 with the hitching bracket 40.

The four supporting boards 60 are disposed on the fixed rack 20 or the movable rack 30 for the mattress to be placed thereon.

The positioning bracket 70 is disposed on a top side of one of the supporting boards 60 for preventing the mattress from displacement. In this embodiment, the positioning bracket 70 is located on the closest supporting board 60 to the foot portion 14.

As a result, when the user wants to combine the electric bed frame 1 with the normal bed existing at home, the user can at first remove the mattress placed on the normal bed, or remove the bedplate for the mattress to be placed thereon as well, and then adjust the relative positions of the hitching brackets 40 to the fixed rack 20 to make the striding portions 42 of the hitching brackets 40 just stride on the two side racks 16 of the bed frame 10, such that the combination of the electric bed frame 1 and the bed frame 10 is accomplished. At last, the mattress can be placed on the electric bed frame 1. In this way, the user has no need to throw away the normal bed existing at home and buy a whole new electric bed, and can enjoy the lifting, lowering and massage effect like the electric bed on the existing normal bed.

Figure 6:
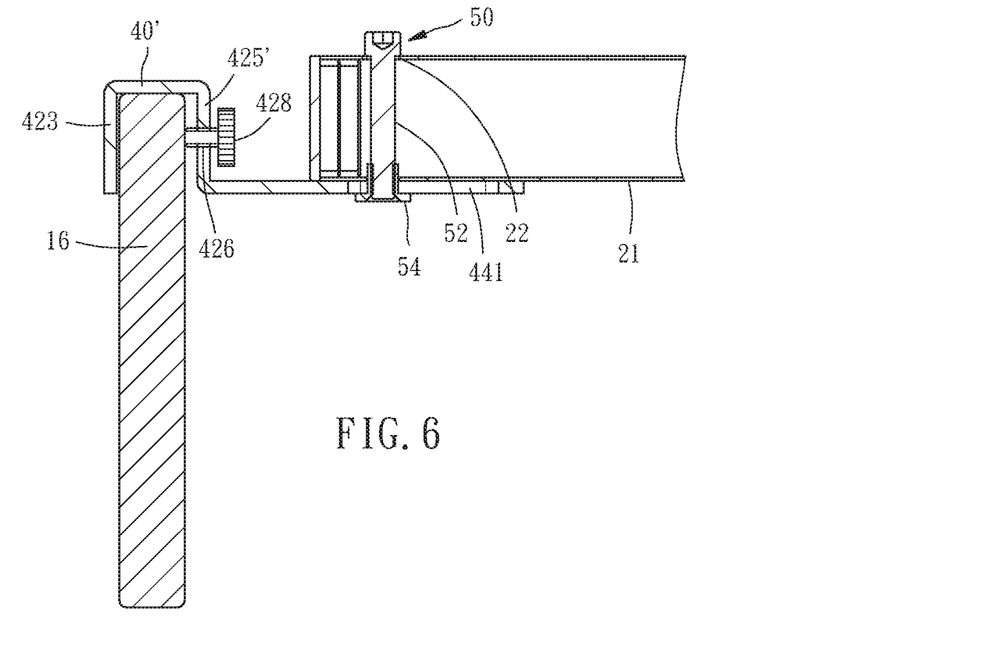
FIG. 6 is a sectional view of a part of a second preferred embodiment of the present invention.
Figure 7:
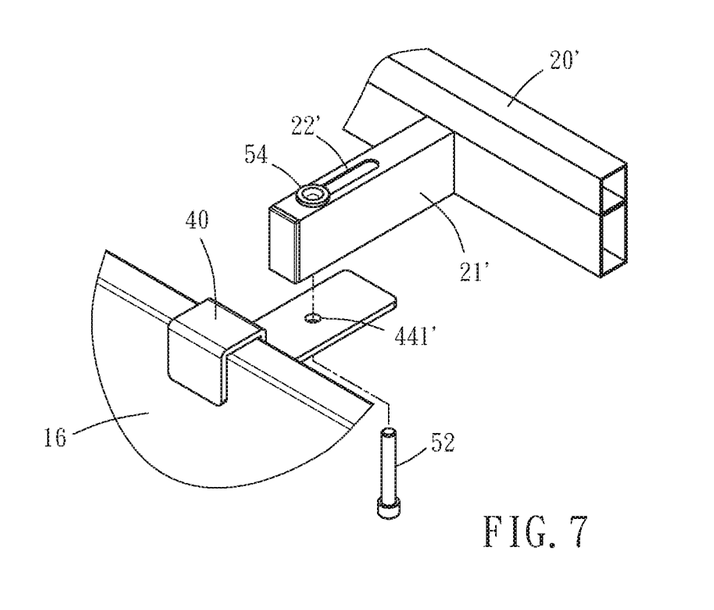
FIG. 7 is an exploded perspective view of a part of a third preferred embodiment of the present invention.
Figure 8:
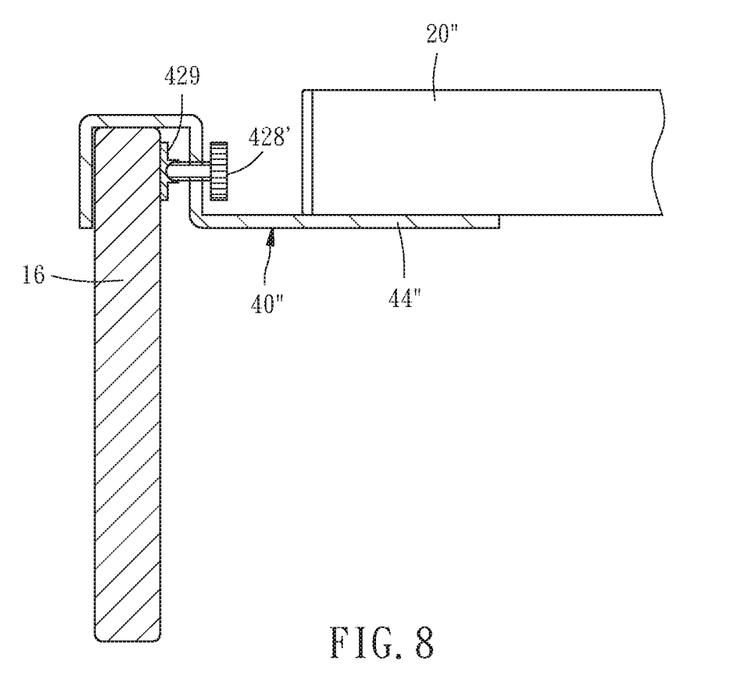
FIG. 8 is a sectional view of a part of a fourth preferred embodiment of the present invention.

To clearly explain that the present invention may have structural variations, other embodiments are provided in the following. Referring to FIG. 6, for the hitching bracket 40' of the electric bed frame 1 according to a second preferred embodiment of the present invention, the inner wall 425' of the hitching bracket 40' has a threaded hole 426 for being screwed with a tightening member 428. An end of the tightening member 428 is adapted to be rotated by the user, and the other end can be abutted against the side rack 16 of the bed frame 10. In this way, the hitching bracket 40' can be disposed on various side racks 16 with various widths. For example, if the side rack 16 has relatively smaller width, the user only needs to screw on the tightening member 428 toward the side rack 16, and thereby the side rack 16 is pressed between the outer wall 423 of the hitching bracket 40' and the aforesaid the other end of the tightening member 428. Besides, the screw bolt 52 is upwardly inserted through the through hole 22 and the groove 441 and screwed with the screw nut 54. Referring to FIG. 7, for the fixed rack 20' of the electric bed frame 1 according to a third preferred embodiment of the present invention, the through hole of the transverse portion 21' of the fixed rack 20' is elongated-shaped, and the through hole 22' is elongated in a direction perpendicular to another direction, in which the side racks 16 of the bed frame 10 are elongated. The through hole 22' also enables the hitching bracket 40 to be adjusted in the relative positions thereof to the fixed rack 20', and in such condition the groove 441' of the hitching bracket 40 may be a circular hole or a through hole with other shapes. Referring to FIG. 8, wherein the fixed rack 20" and the hitching bracket 40" of the electric bed frame 1 according to a fourth preferred embodiment of the present invention are shown, which mostly differ from the first preferred embodiment in that the fixed rack 20" can be directly placed on the transverse portion 44" of the hitching bracket 40" without such fastener 50 connecting the fixed rack 20" and the hitching bracket 40" together. In such condition, the fixed rack 20" may have no such through hole 22, 22', and the hitching bracket 40" may have no such groove 441, 441'. Besides, the tightening member 428' may be provided at an end thereof with an abutting plate 429 for being abutted against the side rack 16 of the bed frame 10. The abutting plate 429 is connected with a main body of the tightening member 428' in a way that the angle therebetween is changeable. When the tightening member 428' is screwed on toward the side rack 16, the relatively larger contacting area of the abutting plate 429 can protect the outside surface of the side rack 16 from abrasion resulted form repeated pressing of the tightening member 428'.

Based on the spirit of the present invention, the structure of the electric bed frame 1 may have other variations. For example, the amount of the hitching brackets 40, 40' may be modified depending on the situation, and the associated fasteners 50 and through holes 22 of the fixed rack 20 may be modified in amount thereof accordingly. The shape of the grooves 441 or the through holes 22, 22' may be modified depending on demands, as long as they enable the fasteners 50 to be adjusted in position. The striding portion 42 may be designed as other shapes, such as C-shape with a downward breach or other shapes, as long as the striding portion 42 can be disposed on the side rack 16 of the bed frame 10.

The above description represents merely the embodiments of the present invention, without any intention to limit the scope of the present invention. The simple structural variations and modifications not to be regarded as a departure from the spirit of the invention are intended to be included within the scope of the following claims.

What is claimed is:

1. An electric bed frame, which is adapted for connection with a bed frame having a head portion, a foot portion and two side racks, two ends of each of the side racks being connected with the head portion and the foot portion respectively, the electric bed frame comprising:
   a fixed rack having a through hole;
   a movable rack movably attached to the fixed rack;
   a hitching bracket having a striding portion for being disposed on the side rack of the bed frame, and an extended portion extended from the striding portion and having a groove; and
   a fastener inserted through the through hole of the fixed rack and the groove of the hitching bracket for connecting the hitching bracket with the fixed rack.

2. The electric bed frame as claimed in claim 1, wherein the groove of the hitching bracket is elongated-shaped.

3. The electric bed frame as claimed in claim 2, wherein the groove is elongated in a direction perpendicular to another direction, in which the side racks of the bed frame are elongated.

4. The electric bed frame as claimed in claim 1, wherein the striding portion of the hitching bracket is reverse-U-shaped.

5. The electric bed frame as claimed in claim 4, wherein the striding portion of the hitching bracket has a top wall for being abutted on a top side of the side rack, an outer wall extended downwardly from an outer side of the top wall, and an inner wall extended downwardly from an inner side of the top wall for sandwiching the side rack between the outer wall and the inner wall.

6. The electric bed frame as claimed in claim 5, wherein the inner wall has a threaded hole for being screwed with a tightening member to enable an end of the tightening member to be abutted against the side rack of the bed frame.

7. The electric bed frame as claimed in claim 6, wherein the tightening member is provided at the end thereof with an abutting plate for being abutted against the side rack of the bed frame.

8. The electric bed frame as claimed in claim 1, wherein the through hole of the fixed rack is elongated-shaped.

9. The electric bed frame as claimed in claim 8, wherein the through hole is elongated in a direction perpendicular to another direction, in which the side racks of the bed frame are elongated.

10. The electric bed frame as claimed in claim 1, wherein the fastener has a screw bolt and a screw nut, which are screwed with each other.

11. An electric bed frame, which is adapted for connection with a bed frame having a head portion, a foot portion and two side racks, two ends of each of the side racks being connected with the head portion and the foot portion respectively, the electric bed frame comprising:
  a fixed rack;
  a movable rack movably attached to the fixed rack; and
  a hitching bracket having a striding portion for being disposed on the side rack of the bed frame, and an extended portion extended from the striding portion and adapted for the fixed rack to be placed thereon.

12. The electric bed frame as claimed in claim 11, wherein the striding portion of the hitching bracket is reverse-U-shaped.

13. The electric bed frame as claimed in claim 12, wherein the striding portion of the hitching bracket has a top wall for being abutted on a top side of the side rack, an outer wall extended downwardly from an outer side of the top wall, and an inner wall extended downwardly from an inner side of the top wall for sandwiching the side rack between the outer wall and the inner wall.

14. The electric bed frame as claimed in claim 13, wherein the inner wall has a threaded hole for being screwed with a tightening member to enable an end of the tightening member to be abutted against the side rack of the bed frame.

15. The electric bed frame as claimed in claim 14, wherein the tightening member is provided at the end thereof with an abutting plate for being abutted against the side rack of the bed frame.

\* \* \* \* \*